Oct. 1, 1963 J. V. BOUYOUCOS 3,105,460

HYDROACOUSTIC OSCILLATOR-AMPLIFIER

Filed July 17, 1961 2 Sheets-Sheet 1

INVENTOR.
JOHN V. BOUYOUCOS
BY Daniel D. Sharp
ATTORNEY

United States Patent Office 3,105,460
Patented Oct. 1, 1963

3,105,460
HYDROACOUSTIC OSCILLATOR-AMPLIFIER

John V. Bouyoucos, 10 Blossom Circle E.,
Rochester, N.Y.

Filed July 17, 1961, Ser. No. 124,658
12 Claims. (Cl. 116—137)

This invention relates to a hydroacoustic oscillator-amplifier and, more particularly, to an acoustic vibration generator including a power amplifier portion which is isolated from a frequency determining oscillator portion thereof so that variations in load impedance will have negligible effect upon the frequency of operation.

Acoustic vibration generators of the self-excited oscillator type are known which convert hydraulic flow energy into acoustic energy when a fluid medium flowing under pressure in a closed path is modulated repetitively by a valving means. The valving means may move back and forth within a stationary port structure which cooperates with the valving means to modulate flow through orifices defined at the opposing ends of the valving means. In this way, the flow of fluid passing into and from oscillator cavities disposed in the fluid path is alternately accelerated and decelerated, causing pressure variations within the cavities. By proper design, these pressure variations may be made to react upon the valving means in such phase relative to the motion of the valving means as to sustain the valving action. These pressure variations give rise to acoustic energy which can be extracted from at least one of the oscillator cavities and transferred by way of appropriate coupling means to an external load. Such generators are illustrated and described in considerable detail in an application for U.S. Letters Patent No. 3,004,512, of John V. Bouyoucos and Frederick V. Hunt, filed July 8, 1958, for "Acoustic-Vibration Generator and Valve."

A hydroacoustic oscillator-amplifier according to the invention embodies a power amplifier portion which, although driven by a frequency-determining oscillator portion, is buffered from the oscillator portion. A principal advantage of the transducer according to the present invention over previous hydroacoustic oscillators is that the operating frequency can be made substantially independent of load impedance, inasmuch as the frequency-determining oscillator portion is isolated from the power amplifier portion of the transducer. Consequently, conditions of optimum power transfer are more easily achieved and maintained in the presence of variable loading conditions.

The frequency of the signal available at the power amplifier output may be made equal to or double the frequency of the control oscillator, depending upon the average position, length and displacement of the valving means relative to the stationary port structure during one cycle motion of the valving means. For example, if the peak displacement of the valving means is such that the orifices at opposite ends of the valving means connecting to a common amplifier cavity each open once for each oscillation cycle of the valving means, the frequency of the acoustic energy at the amplifier output will be twice that of the oscillator. If, on the other hand, the peak displacement of the valving means is never great enough for one of the two orifices to open during the oscillation cycle of the valving means, the frequency of output energy is equal to the frequency of the oscillator.

A distinction between the transducer of this application and the amplifiers and frequency doublers disclosed in U.S. Patent No. 2,792,804 to John V. Bouyoucos and Frederick V. Hunt, issued May 21, 1957, resides in the fact that in the devices shown in U.S. Patent No. 2,792,804, two separate valve assemblies are needed for the oscillator and amplifier portion, with the amplifier valve being driven by pressure variations generated in the oscillator loop. In the present application, the oscillator and amplifier orifices are controlled by a single multiport spool-type valve.

An object of the invention is to provide a hydroacoustic generator having an amplifier portion which, although driven by a frequency-determining control oscillator portion, is buffered therefrom.

Another object of the invention is to provide a hydroacoustic generator wherein optimum power transfer may be achieved and maintained in spite of variable load conditions.

Another object of the invention is to provide a hydroacoustic generator having oscillator and amplifier portions wherein the oscillator and amplifier orifices are controlled by a single valve.

Another object of the invention is to provide a hydroacoustic generator which may be used to supply acoustic energy to a plurality of loads through a number of radiating elements which are coupled either directly or by way of acoustic transmission lines to the hydroacoustic generator.

Other objects and advantages of the invention will become evident from the description of the invention and from the drawings wherein.

Figure 1:
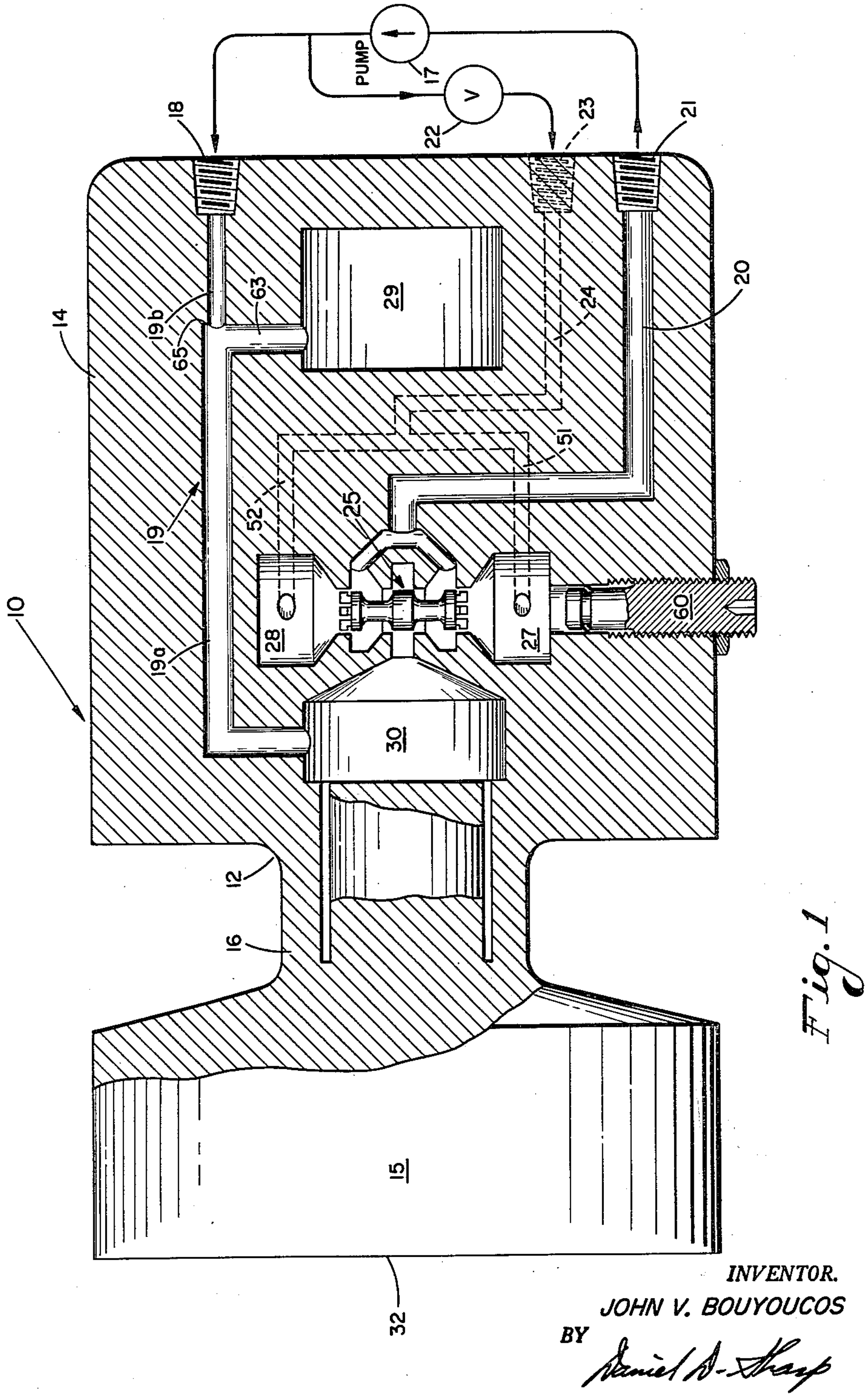
FIG. 1 is a view, partly in central longitudinal section, showing an embodiment of a hydroacoustic oscillator-amplifier according to the invention.
Figure 2:
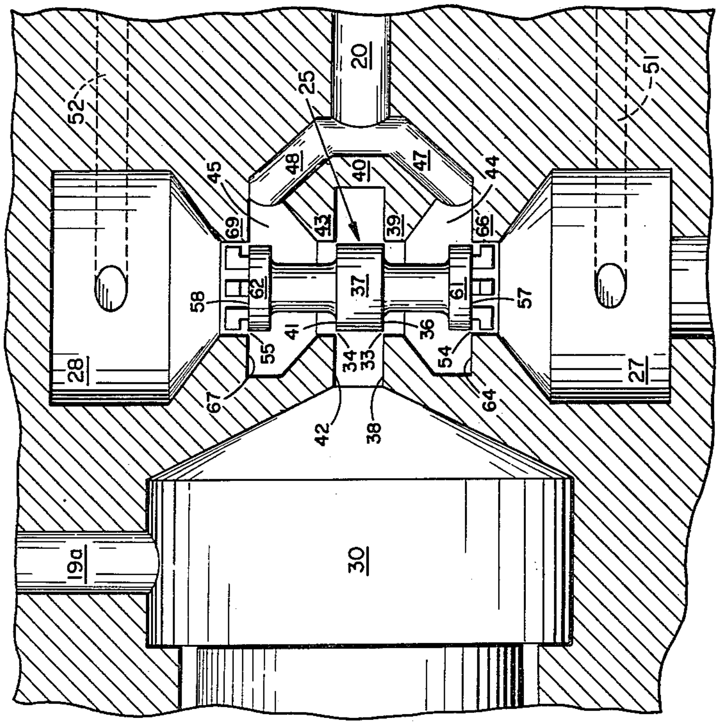
FIG. 2 is an enlargement of a portion of the device of FIG. 1 including the valve, oscillator and amplifier chambers, and fluid transmission means and showing more clearly the details of the valving operation.

Referring to FIGS. 1 and 2, the transducer 10 includes a housing 12 including a cylindrical body portion 14 which is integral with a massive radiating element 15 and an elastic support 16. An input connection 18 and inlet line 19 are provided in the housing 12 for receiving a low viscosity hydraulic fluid under pressure from an appropriate unidirectional flow source or pump 17. The hydraulic fluid under reduced pressure returns through outlet line 20 and an output connector 21 to the pump. Hydraulic fluid from the pump also is supplied through a valve 22 to a second input connector 23 and flows through inlet line 24; the fluid returns by way of the common output connector 21 to the aforesaid pump. A three-land spool valve 25 interposed in the paths of the fluid flow is forced to undergo push-pull reciprocating motion due to acoustic pressure variations generated in oscillator cavities 27 and 28 by virtue of the asymmetrical modulation of flow therethrough. This motion of valve 25, in turn, causes acoustic pressure variations to be set up within amplifier or drive cavity 30 at a frequency preferably for which the mass of the radiating element 15 is in resonance with the stiffness of the elastic support 16, and simultaneously, the inertance of portion 19*a* of feed line 19 is in resonance with the stiffness of the fluid in drive cavity 30. The transducer thereby causes energy represented by the flow of a hydraulic fluid under pressure to be converted into acoustic energy, and then enables this energy to be transferred under optimum power transfer conditions to any acoustic load presented to the radiating or coupling surface 32 of the radiating element 15. A cavity 29 and connecting line 63 is attached to the junction 65 of portions 19*a* and 19*b* of feed line 19 and acts as a Helmholtz resonator to define a zero acoustic pressure point in the acoustic circuit. This point of zero pressure variation serves not only to define a pressure release termination to inertance line 19*a*, but, in addition, provides a convenient point to introduce the hydraulic fluid so as to minimize the possibility of acoustic energy transfer into the pumping system.

Connection of the oscillator circuit inlet line 24 to a separate pressure supply insures independence of the amplifier oscillator operation. In some instances, however, a common inlet connection may be used for both the oscillator and the amplifier portions of the transducer. In such a case, the line 24 may be tapped off cavity 29 and a needle valve used to control the flow to, and the pressure in, the oscillator circuit; hence, the amplitude of valve motion may be controlled independently of pressure supplied to the power amplifier circuit.

Fluid flows into the amplifier portion of transducer 10 through the inlet line 19 and thence into amplifier cavity 30. From cavity 30, the fluid may exit through either of the annular orifices 33 or 34 into respective discharge cavities 44 and 45. Orifice 33 is defined by the axial position of the metering rim 36 of valve land 37 relative to the position of the rim 38 of the inwardly projecting portion 39 of stator port block 40, while orifice 34 is determined by the relative positions of the metering rim 41 of valve land 37 and rim 42 of the inwardly projecting portion 43 of the stator port block. From the discharge cavities 44 and 45, the fluid passes through discharge lines 47 and 48 into outlet line 20 and thence to the low pressure side of the pump.

Fluid flows into the oscillator circuit of the transducer through inlet line 24 and thence through branch lines 51 and 52 which communicate with respective oscillator cavities 27 and 28. The fluid then exits through annular orifices 54 and 55 and discharges, as in the case of the amplifier circuit, through discharge cavities 44 and 45, the corresponding discharge lines 47 and 48, outlet line 20 and output connector 21, in the order named. Orifice 54 is formed by the metering edge 57 of valve land 61 and the cooperating rim 64 of the inwardly projecting portion 66 of stator port block 40, while orifice 55 is determined by the relative positions of the metering rim 58 of valve land 62 and the rim 67 of the projecting portion 69 of the stator port block. The feed lines 51 and 52 are chosen each to be approximately one-quarter wavelength along at the oscillation frequency, thereby presenting a high impedance to the oscillator cavities 27 and 28. The acoustic circuit of the oscillator involves the stiffness of the fluid contained within the cavities 27 and 28, the mass of valve 25, and the regenerative properties of the variable area orifices 54 and 55. The inlet line 24 to the feed lines 51 and 52 is positioned midway between cavities 27 and 28; consequently, the pressure variation at inlet line 24 will be zero, and the feed lines 51 and 52 tend to isolate the acoustic circuit of the oscillator from the flow source. The discharge cavities 44 and 45 may be made sufficiently large to act as a large compliance or acoustic ground as seen by the orifices 54 and 55.

The static or equilibrium position of valve 25 with respect to the stator bore is maintained by the oscillator orifices 54 and 55. The latter provide a stable and fixed equilibrium position of valve 25 so long as the outside diameters of the endmost lands 61 and 62 of valve 25 and the corresponding inside diameters of the projecting portions 66 and 69 of stator port block 40 are substantially the same, and so long as essentially zero lap conditions prevail at both ends simultaneously. The static centering arises from the fact that, if the valve tends to drift slowly off-center, the resulting change in fluid flow through feed lines 51 and 52 will cause unequal static pressures in cavities 27 and 28 which force the valve back to the central position. The central position, of course, is defined by the condition that the static pressures in cavities 27 and 29 are equal, so that the valve experiences zero net static thrust.

The valve 25 is capable of reciprocating freely within the bore in stator port block 40 and into and out of the ports formed by the projecting portions 66 and 69 of stator port block 40. In so doing, the valve opens and closes alternately the corresponding oscillator orifices 54 and 55. Assuming that a flow has been established through the oscillator circuit, movement of the valve 25 in either direction from its central or equilibrium position will be accompanied by push-pull pressure variations in oscillator cavities 27 and 28 resulting from the asymmetrical modulation of the fluid flow through oscillator orifices 54 and 55. As has been shown previously in the aforementioned patent, these pressure variations may react back upon the valve and modify its motion. At the frequency for which the effective mass reactance of the valve 25 equals the net stiffness reactance presented by oscillator cavities 27 and 28, the pressure variations will occur in such phase relationship to the valve motion that self-excited oscillations of the valve can be sustained. Under these circumstances, a portion of the input flow energy is converted to acoustic energy. A part of the acoustic energy is stored in the motion of the valve 25 and in compression of fluid in cavities 27 and 28, and part is dissipated in sustaining the oscillation of the valve. The remaining portion of the input energy is consumed in accelerating the fluid through orifices 33 and 34.

In contrast with hydroacoustic power oscillators wherein the acoustic energy removed from the oscillator cavities is coupled to an external load, the oscillator portion of the transducer of the invention remains substantially unloaded except for the normal internal losses. The primary function of the oscillator portion is to establish an oscillatory motion of valve 25 at a determinable frequency and amplitude. As valve 25 controls the flow of fluid through the oscillator and amplifier circuits, the oscillatory motion imparted to valve 25 by means of the oscillator circuit causes either or both of orifices 33 and 34 of the amplifier circuit to open once during each oscillation cycle, thereby modulating the fluid flow through the power amplifier. Pressure variations thereby set up in the amplifier cavity 30 exert a force upon the massive radiating element 15 to drive the latter on its elastic support 16. Although one radiating element is shown in FIG. 1 as communicating with the amplifier cavity 30, it is possible to have more than one radiating element 15 communicate directly with the amplifier cavity 30.

In contrast with a power oscillator, pressure variations in the amplifier cavity 30 on the high pressure side of the valve are unable to modify the valve motion since the motion of the valve is normal to the resultant force on the valve derived from pressure variations in cavity 30. Thus, variations in loading on the amplifier circuit can have negligible influence upon valve amplitude or frequency of oscillation. The control oscillator circuit is thereby isolated or buffered from the load reaction.

For substantially optimum conditions of energy transfer and efficiency, the oscillation frequency is adjusted so that the modulation frequency in the power amplifier circuit equals simultaneously the resonant frequency of the radiating element 15 and elastic support 16, as well as the resonant frequency of the inertance of the portion 19*a* of feed line 19 and the compliance of cavity 30. An adjustable stud 60 may be provided to change the volume of oscillator cavity 27, thereby varying the frequency of the oscillator over a finite range to achieve the aforementioned conditions of optimum power transfer in the amplifier circuit, that is, to insure that the frequency of modulation coincides with the resonant frequency of the amplifier circuit.

The type or class of modulation in the amplifier circuit depends upon the relative equilibrium position of the metering rims 36 and 41 of valve land 37, rims 38 and 42 of the inwardly extending portions 39 and 43 of the stator port block 40, all respectively. If the corresponding valve metering rims and the rims of the stator port block are normally in a zero overlap condition, as illustrated in the drawing, then each of the orifices 33 and 34 will open once during each oscillation cycle, whereupon the frequency of modulation seen from the amplifier cavity 30 will be twice the oscillator frequency. In these circumstances, that is, with zero overlap at both orifices, the amplifier-oscillator combination acts as a frequency doubler with a class A power amplification. If, on the other hand, the shoulder portions are normally in an overlap condition sufficient to limit flow through each of the orifices to approximately 50 percent of the period of the amplifier frequency, then the amplifier-oscillator acts as a frequency doubler with class B power amplification.

If one metering rim, such as rim 36 of valve land 37, overlaps the corresponding rim of the inwardly extending portion of the stator port block, such as rim 38 of portion 39 of stator port block 40, while the other metering rim 41 of land 37 is normally in a zero overlap condition with respect to rim 42 of inwardly extending portion 43 of the stator port block; and, furthermore, if the peak displacement of valve 25 is never great enough for orifice 33 ever to open during an oscillation cycle (that is, if the metering rim 36 of valve land 37 and the rim 38 of stator portion 39 always overlap) then only orifice 34 can provide significant flow modulation. Since orifice 34 will open once for every oscillation cycle, the modulation frequency as seen from amplifier cavity 30 will be equal to the oscillator frequency. This mode of modulation has the characteristics of class B single-ended modulation wherein flow through orifice 34 for a zero lap condition will occur for about 50 percent of each oscillation cycle, and the volume flow, at least at low pressure modulation, varies with time in a manner similar to a half-wave rectified sinusoidal waveform.

It should be noted that, although the diameters of the oscillator and amplifier orifices are shown identical in the drawing, this condition is not essential. In some instances, the amplifier valve and bore diameter may be made substantially larger than the corresponding valve and bore diameter of the oscillator, thereby increasing the power handling capability of the amplifier, without substantially changing the relatively smaller power requirements of the control oscillator.

Figure 3:
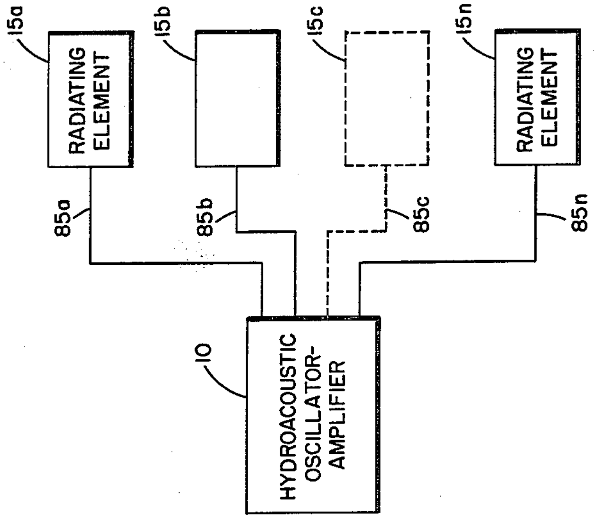
FIG. 3 is a schematic diagram illustrating the use of several radiating elements coupled to a hydroacoustic oscillator-amplifier of the type shown in FIGS. 1 and 2.

As indicated schematically in FIG. 3, acoustic energy in amplifier cavity 30 may be used to supply a plurality of loads, such as radiating elements 15*a*, 15*b* . . . 15*n*. The amplifier cavity 30 may communicate directly with the various radiating elements 15, as previously mentioned. Alternately, the amplifier cavity 30 may communicate indirectly with the radiating elements, as by means of acoustic transmission lines 85*a*, 85*b* . . . 85*n*. The length of each of the transmission lines may be chosen to achieve optimum impedance matching between the radiating elements and the amplifier cavity 30. In the event the lengths are equal, and the load impedances are similar, the radiating elements may be driven in phase synchronism. On the other hand, unequal lengths may be selected to achieve steering of the radiated beam.

This invention is not limited to the particular details of construction, materials and processes described herein, as many equivalents will suggest themselves to those skilled in the art. For example, the acoustic energy available in the amplifier cavity may be radiated uniformly at relatively low energy density from the entire surface of a large energy radiating element or may be coupled at comparatively high energy density to a load such as a drill bit. It is desired, accordingly, that the appended claims be given a broad interpretation commensurate with the scope of the invention within the art.

What is claimed is:

1. An acoustic vibration device comprising a housing having formed therein fluid transmission means for accommodating the flow of fluid under pressure, said housing further having formed therein a port structure disposed along said transmission means, oscillator chamber means, a valve mounted for movement relative to said port structure and having at least a portion thereof exposed to said oscillator chamber means, said valve having first and second land means, the first land means of said valve and said port structure cooperating to form variable oscillator orifice means intercoupling said oscillator chamber means and said fluid transmission means for modulating in sustained manner the flow of fluid through said oscillator orifice means to produce pressure variations within said oscillator chamber means, and amplifier chamber means, said second valve land means cooperating with said port structure to form variable amplifier orifice means communicating with said amplifier chamber means for controlling the flow of fluid through said port structure and said amplifier chamber means in accordance with the oscillatory motion of said valve to create pressure variations within said amplifier chamber means productive of acoustic energy.

2. An acoustic vibration device as recited in claim 1 wherein the pressures in said amplifier chamber exert forces on said valve only in a direction normal to the direction of motion of said valve.

3. An acoustic vibration device comprising a housing having formed therein fluid transmission means for accommodating the flow of fluid under pressure, said housing further having formed therein a port structure disposed along said transmission means, oscillator chamber means, a valve mounted for movement relative to said port structure and having at least a portion thereof exposed to said oscillator chamber means, said valve having first and second land means, the first land means of said valve and said port structure cooperating to form variable oscillator orifice means intercoupling said oscillator chamber means and said fluid transmission means for modulating in sustained manner the flow of fluid through said oscillator orifice means to produce pressure variations within said oscillator chamber means, amplifier chamber means, said second valve land means cooperating with said port structure to form variable amplifier orifice means communicating with said amplifier chamber means for controlling the flow of fluid through said port structure and said amplifier chamber means in accordance with the oscillatory motion of said valve to create pressure variations within said amplifier chamber means productive of acoustic energy, and energy output coupling means driven by said pressure variations within said amplifier chamber means, said energy output coupling means being isolated from said oscillator chamber means.

4. An acoustic vibration device comprising a housing having formed therein fluid transmission means for accommodating the flow of fluid under pressure, said housing further having formed therein a port structure disposed along said transmission means, oscillator chamber means, a valve mounted for movement relative to said port structure and having at least a portion thereof exposed to said oscillator chamber means, said valve having first and second land means, the first land means of said valve and said port structure cooperating to form variable oscillator orifice means intercoupling said oscillator chamber means and said fluid transmission means for modulating in sustained manner the flow of fluid through said oscillator orifice means to produce pressure variations within said oscillator chamber means, amplifier chamber means, said second valve land means cooperating with said port structure to form variable amplifier orifice means communicating with said amplifier chamber means for controlling the flow of fluid through said port structure and said amplifier chamber means in accordance with the oscillatory motion of said valve to create pressure variations within said amplifier chamber means productive of acoustic energy, and a plurality of radiating elements communicating with said amplifier chamber means.

5. An acoustic vibration device as set forth in claim 4 wherein each of said radiating elements communicates with said amplifier chamber means by way of an individual acoustic transmission line.

6. An acoustic vibration device comprising a housing having formed therein fluid transmission means for accommodating the flow of fluid under pressure, said housing further having formed therein a port structure disposed along said transmission means, said port structure having at least two distinct flow-controlling regions, oscillator chamber means, a valve mounted for movement relative to said port structure and having at least a portion thereof exposed to said oscillator chamber means, said valve having first and second land means, the first land means of said valve and said port structure cooperating to form variable oscillator orifice means intercoupling said oscillator chamber means and said fluid transmission means for modulating in sustained manner the flow of fluid through said oscillator orifice means to produce pressure variations within said oscillator chamber means, and amplifier chamber means, said second valve land means cooperating with said port structure to form a pair of oppositely disposed variable amplifier orifice means communicating with said amplifier chamber means for controlling the flow of fluid through said port structure and said amplifier chamber means in accordance with the oscillatory motion of said valve to create pressure variations within said amplifier chamber means productive of acoustic energy.

7. An acoustic vibration device as recited in claim 6 wherein said valve has an equilibrium position wherein there is zero lap at both of said amplifier orifices between said valve and said port structure.

8. An acoustic vibration device as recited in claim 6 wherein said valve has an equilibrium position wherein the overlap at each of said amplifier orifices is substantially seventy percent of the peak displacement of said valve.

9. An acoustic vibration device as recited in claim 6 wherein said valve has an equilibrium position and a peak displacement such that one of said pair of amplifier orifices is always closed and the second of said pair exhibits a zero lap condition in the equilibrium position.

10. An acoustic vibration device as recited in claim 6 wherein the diameter of said second valve land means is greater than the diameter of said first land means.

11. An acoustic vibration device comprising a housing having formed therein inlet fluid transmission means and outlet fluid transmission means for accommodating the flow of fluid under pressure, said housing further having formed therein a port structure disposed between said inlet transmission means and said outlet transmission means, said port structure having first and second flow-controlling regions, oscillator chamber means, a valve having at least a portion thereof exposed to said oscillator chamber means, said valve having first and second land means, the first land means of said valve and said first region of said port structure cooperating to form first variable orifice means intercoupling said oscillator chamber means and one of said fluid transmission means, said valve being mounted for movement relative to said port structure and driven initially by an unbalance of forces upon said valve for modulating repetitively the flow of fluid to said first orifice means to produce pressure variations within said oscillator chamber means, said pressure variations reacting upon said valve in such phase relative to the motion of said valve as to maintain oscillatory flow modulation at a frequency dependent upon the acoustic impedance of said valve and fluid present within said oscillator chamber means, and amplifier chamber means, said second valve land means cooperating with said second region of said port structure to form second variable orifice means communicating with said amplifier chamber means for controlling the flow of fluid through said second region of said port structure and said amplifier chamber means in accordance with the oscillatory motion of said valve to create pressure variations within said amplifier chamber means productive of acoustic energy.

12. An acoustic vibration device comprising a housing having formed therein inlet fluid transmission means and outlet fluid transmission means for accommodating the flow of fluid under pressure, said housing further having formed therein a port structure disposed between said inlet transmission means and said outlet transmission means, said port structure having first and second flow-controlling regions, oscillator chamber means, a valve having at least a portion thereof exposed to said oscillator chamber means, said valve having first and second land means, the first land means of said valve and said first region of said port structure cooperating to form first variable orifice means intercoupling said oscillator chamber means and one of said fluid transmission means, said valve being mounted for movement relative to said port structure and driven initially by an unbalance of forces upon said valve for modulating repetitively the flow of fluid to said first orifice means to produce pressure variations within said oscillator chamber means, said pressure variations reacting upon said valve in such phase relative to the motion of said valve as to maintain oscillatory flow modulation at a frequency dependent upon the acoustic impedance of said valve and fluid present within said oscillator chamber means, amplifier chamber means, said second valve land means cooperating with said second region of said port structure to form second variable orifice means communicating with said amplifier chamber means for controlling the flow of fluid through said second region of said port structure and said amplifier chamber means in accordance with the oscillatory motion of said valve to create pressure variations within said amplifier chamber means productive of acoustic energy, and an energy output coupling element having a portion thereof exposed to said amplifier chamber means and subjected to said acoustic energy, said coupling element being driven in response to said acoustic energy generated within said amplifier chamber means.

References Cited in the file of this patent

UNITED STATES PATENTS 2,792,804 Bouyoucos et al. -------- May 21, 1957